UNITED STATES PATENT OFFICE.

LEONHARD LEDERER, OF MUNICH, GERMANY, ASSIGNOR TO THE DR. F. VON HEYDEN NACHFOLGER, OF RADEBEUL, GERMANY.

PROCESS OF OBTAINING OXYBENZYLIC ALCOHOL.

SPECIFICATION forming part of Letters Patent No. 563,975, dated July 14, 1896.

Application filed May 31, 1894. Serial No. 513,044. (No specimens.)

*To all whom it may concern:*

Be it known that I, LEONHARD LEDERER, a subject of the King of Bavaria, residing at Munich, in the Kingdom of Bavaria, German Empire, have invented a new and useful Process of Producing Oxybenzylic Alcohols and its Homologues, of which the following is a specification.

My invention has reference to a process for manufacturing oxybenzylic alcohols and their homologues, such as oxymethylbenzylic, oxymethylpropylbenzylic, and oxymethoxyallylbenzylic alcohols; and it consists, essentially, in placing phenol, cresol, thymol, or eugenol in reciprocal action with formic aldehyde, in the presence of non-acid condensing agents.

I will now proceed to describe one process of carrying out my invention. To one part phenol and one and one-half parts of formic aldehyde (commercial aqueous solution) is added milk of lime or baryta-water. The mixture is allowed to stand at ordinary temperature, or, in order to accelerate the reaction, it may be heated to about 60° centigrade. In the latter case the formation of oxybenzylic alcohol can be proved after the lapse of half an hour. To prevent the formation of secondary products, samples of the fluid are taken from time to time and the reaction is interrupted as soon as the production of oxybenzylic alcohol ceases. After neutralization with carbonic acid or acidification with acetic acid, free phenol is driven off by means of steam and the oxybenzylic alcohols are extracted from the residue by means of ether. The reaction is expressed by the following equation:

$$C_6H_5.OH + CH_2O = C_6H_4(OH).CH_2OH.$$

The process may also be carried out as follows: To one part of phenol and one and one-half parts of formic aldehyde is added powdered zinc (or zinc chips or iron) and the whole heated to the boiling-point. When no further formation of oxybenzylic alcohol is noticed, the free phenol is removed by a blast of steam, and the oxybenzylic alcohols are taken up from the residue by ether.

It is essential for the production of oxybenzylic alcohols and their homologues that acids be entirely absent, and for this reason it is necessary to make use of non-acid condensing agents, such as metals in their finely-divided state, oxids, hydroxids, or basic or neutral salts. In the same way the homologues of the oxybenzylic alcohols are manufactured.

The oxybenzylic alcohols are colorless well-cystallizing compounds and are distinguished by their aqueous or alcoholic solutions giving with ferric chlorid characteristic color reactions.

*Oxybenzylic alcohols.*—$C_6H_4(OH)CH_2OH$. Ortho-oxybenzylic alcohol (saligenin). Melting-point 86°. Leaves. Readily soluble in ether and hot water, slightly soluble in cold benzol. Para-oxybenzylic alcohol. Melting-point 116°. Readily soluble in ether, slightly soluble in chloroform.

*Oxymethylbenzylic (homobenzylic) alcohols.*—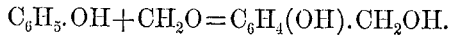$C_6H_3(CH_3)CH_2OH$. Oxymethyl, (1.2,) benzylic alcohol. Melting-point 40°. Long silky glossy needles. Readily soluble in alcohol, ether, and benzene.

*Oxymethyl, (1.3,) benzylic alcohol.*—Melting-point 110°; crystals similar to fern. Very slightly soluble in benzene.

*Oxymethyl, (1.4,) benzylic alcohols.*—a. (1.4.2.) Melting-point 107°. Leaves. Readily soluble in alcohol, ether, and hot benzene. b. (1.4.3.) Melting-point 133°. Plates. Readily soluble in hot alcohol and acetone.

*Oxymethylpropyl, (1.5.2,) benzylic alcohol.*—Melting-point 78°. Small needles. Very readily soluble in alcohol, ether, benzene, and petroleum-ether.

*Oxymethoxyallyl, (1.2.4,) benzylic alcohol.*—Melting-point 37°. Small leaves. Very readily soluble in ether and benzene. Smells of vanillin.

Having now fully described and ascertained the nature of my said invention and in what manner the same is to be performed, I declare that what I claim is—

1. The herein-described process for manufacturing oxybenzylic alcohols and their homologues, consisting in placing aromatic phenols, such as phenol, creosol, thymol or eugenol, in reciprocal action with formic aldehyde in the presence of an alkaline, neutral, or basic condensing agent as specified.

2. The herein-described process for the manufacture of oxybenzylic alcohols and their homologues, consisting in placing aromatic phenols, such as phenol, creosol, thymol or eugenol, in reciprocal action with formic aldehyde in the presence of a non-acid condensing agent, removing the free phenol by steam, and extracting the oxybenzylic acid with ether.

3. The herein-described process for the manufacture of oxybenzylic alcohols and their homologues, consisting in placing phenol in reciprocal action with formic aldehyde in the presence of a non-acid condensing agent, removing the free phenol by steam, and extracting the oxybenzylic acid with ether.

In testimony whereof I have signed my name to this specification in the presence of two subscribing witnesses.

LEONHARD LEDERER.

Witnesses:
LEONHARD WALKER,
GEORG COHN.